| United States Patent [19] | [11] Patent Number: 4,684,691 |
| Stahl et al. | [45] Date of Patent: Aug. 4, 1987 |

[54] PROCESS FOR THE PRODUCTION OF SICCATIVATED AQUEOUS LACQUERS WITH POLYBUTADIENE/MALEIC ACID ANHYDRIDE ADDUCTS AS BONDING AGENT

[75] Inventors: Hans G. Stahl, Oldenburg; Peter Höhlein, Kempen; Hans-Joachim Traenckner, Fallingbostel; Lothar Fleiter, Krefeld; Jürgen Schwindt, Leverkusen, all of Fed. Rep. of Germany

[73] Assignee: Bayer Aktiengesellschaft, Leverkusen, Fed. Rep. of Germany

[21] Appl. No.: 757,800

[22] Filed: Jul. 22, 1985

[30] Foreign Application Priority Data

Aug. 2, 1984 [DE] Fed. Rep. of Germany ....... 3428495

[51] Int. Cl.$^4$ .............................................. C08L 51/00
[52] U.S. Cl. .................................................. 524/534
[58] Field of Search ......................................... 524/534

[56] References Cited

U.S. PATENT DOCUMENTS 4,101,495  7/1978  Patzschke et al. .................. 524/534

*Primary Examiner*—Paul R. Michl
*Assistant Examiner*—Alex H. Walker
*Attorney, Agent, or Firm*—Connolly and Hutz

[57] ABSTRACT

Aqueous lacquers, which contain grafted polybutadiene/maleic acid semi-esters or semi-amides as bonding agent, can be siccativated while the siccative is firstly dispersed in the aqueous phase and the bonding agent is dispersed in this dispersion.

2 Claims, No Drawings

PROCESS FOR THE PRODUCTION OF SICCATIVATED AQUEOUS LACQUERS WITH POLYBUTADIENE/MALEIC ACID ANHYDRIDE ADDUCTS AS BONDING AGENT

This invention relates to a process for the production of siccativated aqueous lacquers with grafted polybutadiene/maleic acid anhydride adducts, which are semi-amidated or -esterified and partially neutralized, as bonding agent.

An incentive has always existed for the use of polybutadiene oils as a base for lacquer bonding agents, since polybutadienes with a high cis proportion dry quickly in air and the films thus obtained are very resistant to chemicals.

The modification of polybutadienes by addition of maleic acid anhydride is described in DE-AS No. 12 92 288 and in DE-PS No. 12 19 684. Films consisting of these adducts have an improved adhesion compared with unmodified polybutadienes.

By the graft reaction of unsaturated monomers on polybutadiene/maleic acid anhydride adducts, products with improved drying are obtained (DE-AS No. 27 33 274=U.S. Pat. No. 4,162,240), which should also possess a large number of other good properties (DE-AS No. 26 33 362=U.S. Pat. No. 4,075,135, DE-AS No. 27 54 733=U.S. Pat. No. 4,137,182). Both the polybutadiene/maleic acid anhydride adducts (DE-AS No. 10 26 900) and the graft products produced therefrom (DE-AS No. 26 33 362, 27 33 274, 27 54 733) can be partially esterified or amidated, and the carboxyl groups arising from the anhydride groups can be partially or completely neutralized, so that the resin becomes water-soluble or water-dispersable.

According to the known Japanese Patent Application No. 43 381/1974 and the published Japanese Patent Application No. 73488 1973, an emulsion is produced by polymerisation of a vinyl monomer in the presence of a maleinated polybutadiene or maleinated butadiene copolymer as emulsifier.

According to DE-OS No. 2733274, it was however established by reworking, that the emulsion produced according to JP No. 43 381/1974 has a relatively low stability and leads to coatings with relatively bad qualities such as a low resistance to corrosion, since the maleinated product of the polybutadiene, has a large number of 1,4-bonds in the internal double bonds of the molecule, so that the graft polymerisation hardly drains off with the vinyl monomers.

In order to avoid these disadvantages, the maleinated product of a polydiolefin with a large number of 1,4-bonds or a copolymer thereof is graft-polymerised according to DE-OS No. 2733274 with compounds which contain vinyl-polymerizable double bonds.

The vinyl-graft polymer emulsions produced in this manner possess different advantages, for example a finer particle size of the emulsion and, moreover, better frost resistance, miscibility with pigment and mechanical stability.

On the other hand, they have disadvantages due to their high molecular weight character, such as limited pigment absorption, reductions in luster as well as problems of compatibility with other polymers.

The nature of the polymerisation itself must, however, be seen as the main obstacle to universal use, the polymerisation being carried out in an aqueous suspension and thus limiting the choice of reaction medium to water alone and, moreover, only permitting the production of very high molecular weight products.

If it is desired to siccativate aqueous lacquers based on the described bonding agents for the purpose of accelerated drying, the use of water-soluble siccatives is excluded since they render the dried lacquer film capable of being attacked by water and chemicals. Water-insoluble siccatives on the other hand cannot be distributed homogeneously in aqueous lacquer, this being, however, a prerequisite for even drying. The conceivable variants, in which the siccative is added in the aqueous phase to the modified polybutadiene before the distribution thereof, would demand that the polybutadiene be stirred for a relatively long time at a high temperature, until a homogeneous mixture of the siccative in the polybutadiene has actually arisen. In such a stage of the process, in which the polybutadiene is subjected to a relatively high temperature for a relatively long time, the number of its reactive double bonds must, however, be reduced and the viscosity increased, which is naturally undesirable.

An aim of the invention was to remove these disadvantages and produce a low molecular weight, grafted maleinated polybutadiene with good compatibility properties and in the preparation of the delivery form produce a wider variety of dissolving possibilities, the composition of which should cover a wide spectrum of use such as the production of coating materials, adhesives, fibres, paper and the like.

The process according to the invention was in particular to make possible the production of cosolvent-free water lacquers which dry in the air with excellent corrosion-protective properties, fast drying, good adhesion on various bases, long stability in storage and thus wide possibilities for application, good resistance to water and great hardness.

The object of the invention is a process for the production of siccativated aqueous lacquers, the bonding agent component of which is a partially neutralized resin, which consists of A. from 40 to 70% by weight of polybutadiene,
B. from 7 to 20% by weight of maleic acid anhydride, up to half the weight of which can be replaced by semi-drying or drying oils,
C. from 10 to 35% by weight of graft monomer and
D. from 3 to 10% by weight of monoalcohol or monoamine, based, in each case, on the sum of the components A, B, C and D, the carboxyl groups of this resin, which correspond before neutralization to an acid number of from 40 to 160, preferably from 50 to 80, are neutralized to from 20 to 80, preferably from 60 to 75, %, characterised in that the production of the resin from the components A to D is carried out without addition of water and that from 1 to 8, preferably from 2 to 6% by weight, based on unneutralised resin, of the aqueous dispersion of a siccative is added to the aqueous phase consisting of water, base and optionally auxiliary before dispersion of the resin of A, B, C and D, with the proviso that this siccative dispersion contains (a) from 15 to 20% by weight of water-insoluble siccative
(b) from 10 to 20% by weight of a water-miscible organic solvent,
(c) from 1 to 20% by weight of emulsifier and
(d) from 40 to 74% by weight of water, based, in each case, on the aqueous siccative dispersion The property of allowing the direct grinding of pigments in the bonding agent, without the relatively costly procedure of the grinding process, usual in the case of dispersions, having to be carried out via fine pastes, is to be regarded as a particularity of the lacquers produced according to the invention.

Preferred polybutadienes A contain at least 50, generally at least 70 and preferably at least 90% by weight of buta-1,3-diene radicals and at most 50, generally at most 30 and preferably at most 10% by weight of radicals with buta-1,3-diene copolymerisable ethylenically unsaturated monomers, such as 2-chlorobuta-1,3-diene-2,3-dimethyl buta-1,3-diene, isoprene, styrene, α-chlorostyrene, vinyl toluene, divinyl toluene, diisobutylene, penta-1,3-diene, vinyl acetate, methyl methacrylate, butyl methacrylate, ethyl acrylate, butyl acrylate, isopropenyl acetate, allyl chloride, allyl cyanide, dibutyl itaconate, ethyl-α-chloroacrylate, diethyl maleate, acrylonitrile, methacrylonitrile, ethacrylonitrile.

Preferred polybutadienes have on average a definite molecular weight of from 300 to 10,000, preferably from 700 to 5,000,
from 9 to 90, preferably from 25 to 80% of 1,2-linkages, and
from 10 to 95, preferably from 20 to 75% of 1,4-linkages as well as
from 70 to 90% of cis-double bonds,
from 10 to 30% of trans-double bonds and
from 0 to 3% of vinyl double bonds Preferred polybutadienes A have a viscosity of from 150 to 50,000 preferably from 200 to 5,000 cPoise at 20° C., an iodine number according to Wiys of from 400 to 470 g iodine/100 g of substance and a density of from 0.800 to 0.950 g/ml at 20° C.

Such polybutadienes are known; they are described, for example, in DE-AS No. 11 86 631 and in U.S. Pat. Nos. 3,789,046 and 3,789,090.

Preferred fatty acids and oils, which can replace the maleic acid anhydride B by up to a half, are those with iodine numbers of from 120 to 210, preferably from 150 to 190, such as sunflower oil, soya oil, tall oil, dehydrated castor oil, oiticica oil, perilla oil, safflower oil, preferably linseed oil and wood oil, and the fatty acids of these oils.

The production of adducts from polybutadiene A, maleic acid anhydride B (and optionally semi-drying or drying oils or the fatty acids thereof) can be carried out according to known methods. The components are generally heated for from 1 to 3 h to a temperature of from 100° to 250° C. with the simultaneous passing through or over of a flow of inert gas, for example nitrogen, the addition of from 0.01 to 0.5% by weight, based on the sum A+B, of a polymerisation inhibitor being effective. Preferred inhibitors are, for example, hydroquinone, 2,5-di-tert.-butyl-hydroquinone and -benzoquinone, preferably copper and copper compounds soluble in organic solvents, such as copper naphthenate and copper acetylacetonate.

Preferred graft monomers C are monomers which have at least one ethylenic double bond, particularly vinyl-, vinylidiene-, acrylic- and methacrylic compounds, such as styrene, -methyl styrene, p-chlorostyrene, vinyl toluene, acrylic acid- and methacrylic acid esters of $C_1$–$C_{18}$-alcohols, methoxybutyl acrylate, methoxybutyl methacrylate, methoxyethyl acrylate, methoxyethyl methacrylate, ethoxybutyl acrylate, ethoxybutyl methacrylate, allyl acrylate, allyl methacrylate, glycidyl methacrylate, glycidyl acrylate, hydroxypropyl methacrylate, diethylaminoethyl methacrylate, allyloxethyl acrylate, allyloxethyl methacrylate, vinyl pyridine, butadiene, isoprene, chloroprene, acrylonitrile, methacrylonitrile, vinyl acetate, vinyl chloride, acrylic acid, methacrylic acid, itaconic acid, acrylic amide, methylacrylic amide, N-methylacrylic amide, N-methylolacrylic amide, N-methylolmethacrylic amide, 2-hydroxyethyl methacrylate, acrolein and mixtures of these monomers.

The graft reaction can be carried out in a solution, but preferably as mass polymerisation, preferably in the presence of a radical-former at a temperature of from 20 to 200, particularly from 60° to 180° C.

The procedure is similar in the solution polymerisation with the difference that it is carried out in an organic solution at from 50° to 130° C.

The partial esterification or amidation of the graft product can be carried out according to usual methods. The graft product is, for example, reacted with the monoalcohol or monoamine in the presence, preferably, however, in the absence of an organic solvent at from 30° to 150° C., optionally in the presence of a polymerisation inhibitor and optionally a catalyst.

Preferred monoalcohols and monoamines are, for example, dimethylamine, diethylamine, diethanolamine, di-iso-propylamine, di-n-butylamine, methanol, ethanol, isopropanol, n-propanol, tert.-butanol, iso-butanol, n-butanol, 2-hydroxyethyl acrylate, 2-hydroxypropyl acrylate, 2-hydroxy-ethyl methacrylate, 2-hydroxypropyl methacrylate, N-methylol (meth)-acrylic amide and mixtures thereof.

By "partial" esterification or amidation of the graft product is to be understood the ring-opening reaction with from 10 to 90% of the anhydride groups of the graft product. The degree of esterification or amidation, which is necessary for the production of a stable emulsion, is principally dependent on the number of anhydride groups of the addition compound of A and B and can be experimentally determined in an isolated case.

These semi-esters and semi-amides can naturally also be produced such that the adduct of A and B is reacted with the monoalcohol or -amine and then the semi-esters or semi-amides thus obtained are grafted with the monomer C.

Since in the preferred embodiment, that is mass polymerisation, a viscous carboxyl group-containing solvent-free bonding agent is present after the last reaction, it must be in the form of a water-dilutable form, which occurs by neutralization of at least 20% of the neutralizable carboxyl groups.

Either an aqueous inorganic base, such as sodium hydroxide solution or potassium hydroxide solution or ammonia, or a quaternary ammonium hydroxide such as trimethyl-benzyl- or -lauryl-ammonium hydroxide, can be used for neutralization. Water-soluble primary, secondary and tertiary amines, such as methylamine, ethylamine, propylamine, dimethylamine, diethylamine, dipropylamine, trimethylamine, tripropylamine, monoethanolamine, monobutanolamine, diethanolamine, dibutanolamine, triethanolamine and tributanolamine are, however, preferably used..

The pH of the neutralized and grafted semi-amide or semi-ester dispersed in water, should be maintained in a range of from 6.0 to 10.0, preferably from 7 to 9. If the pH is substantially lower than 6.0, a physical separation of the dispersion occurs.

For the various uses, these resin-type products are present as an aqueous dispersion with a content, of solid resin of from 1 to 60% by weight. The term "aqueous dispersion" used here includes two-phase, aqueous resin systems, particularly those in which the aqueous phase forms the continuous phase, and is used here such that it also includes homogeneous aqueous solutions, which optionally appear clear. These aqueous dispersions have dispersed phases with an average particle diameter of from 0.1 to 5 microns.

In the aqueous dispersion, the carrier resin can be used as such for the production of clear films, however the dispersions generally also contain a pigment and usual additives. The usual pigments can be used as pigment, such as iron oxide, lead oxide, strontium chromate, carbon black, titanium dioxide, talcum, barium sulphate and the like as can mixtures of these and of other pigments. Coloured pigments can also be contained in the dispersions, such as cadmium yellow, cadmium red, phthalocyanine blue, chrome yellow, toluidine red, hydrated iron oxide and the like. The dispersions can, moreover, contain dispersing agents or surface-active agents.

Generally, the pigment and the surface-active agents, if they are used, are crushed together with a portion of the carrier resin, so as to produce a paste. This paste is then mixed with the major portion of the carrier resin, in order to produce the dispersion to be used as coating composition. Examples of other additives which can be added to the coating compositions, are antioxidants, wetting agents, drying agents, anti-foaming agents and suspending agents.

Preferred siccatives (a) are the napthenates, resinates, oleates, linoleates, octoates and maleates of the metals cobalt, manganese, lead, nickel, chromium, zirconium, iron, zinc, aluminium and calcium. The preferred siccatives are cobalt napthenate and cobalt octoate.

Preferred water-miscible organic solvents (b) are monovalent aliphatic alcohols such as methanol, ethanol, isopropanol, glycolalkylethers such as glycolmonobutylethers and the esters thereof such as ethylglycolacetate, cyclic ethers such as dioxan, tetrahydrofuran, ketones such as acetone and, preferably, lactams such as N-methylpyrrolidone.

Preferred emulsifiers (c) can be of the ionic or nonionic type or of mixed types, as described, for example, in "Methoden der Organischen Chemie" (Houben-Weyl), Vol. 14/1, 4th Edition, Georg Thieme Verlag, Stuttgart 1961, p 190-208.

Preferred ionic emulsifiers are $C_{12-18}$-alkylsulphates sulphates and -sulphonates. Preferred non-ionic emulsifiers are compounds of the formula

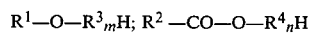

wherein $R^1$ and $R^2$ represent an aliphatic, cycloaliphatic, araliphatic or aromatic group having from 7 to 25 carbon atoms, $R^3$ and $R^4$ represent $C_2H_5O$, $C_3H_7O$ or $C_4H_9O$ and m and n represent integers of from 3 to 100.

Preferred mixed type emulsifiers can be prepared by sulphating the hydroxyl groups of non-ionic emulsifiers.

Moreover, oligomers and polymers can be used as emulsifers. Among these are included, for example, protective colloids such as casein, partially and completely saponified polyvinyl acetate, polymers and copolymers of acrylic acid or methacrylic acid, whereby the carboxyl groups can be completely or partially neutralized.

The siccativated aqueous lacquers produced according to the invention can ideally display their drying-accelerating effect owing to the even distribution of the siccative and activate a fast oxidative crosslinking of the lacquer film, so that even after a short time, good corrosion protection with great chemical resistance is achieved at a high mechanical level.

The application of the lacquers produced from these bonding agents takes place in practice according to the usual processes such as spraying, immersion, pouring, rolling etc. The electrophoretic deposition from corresponding baths can also be undertaken.

In the following examples, the invention is explained in more detail. All proportions and percentage data are weight data and relate to the non-volatile solids materials, unless otherwise indicated.

EXAMPLE 1

Product I 2090 g of polybutadiene oil with a molecular weight of 1,500, a viscosity of 750 mPa.s at 20° C. and 72% of 1,4-cis-linkages, 27% of 1,4-trans-linkages and 1% of vinyl linkages are weighed in a 4 l glass flask provided with a nitrogen inlet pipe, base and side heating, reflux condenser as well as a stirrer and heated to 180° C. with constant throughflow of a weak nitrogen flow with addition of 410 g of maleic acid anhydride, 1.1 g of acetyl acetone, 11.0 g of copper naphthenate (10% solution in xylene with 9% Cu-content) and maintained at this temperature for 6 h. A viscous oil with an acid number according to anhydride ring-opening with water of 163 is obtained.

PRODUCT II

After cooling to 140° C., 861 g of styrene, 9.8 g of tert.-dodecylmercaptan and 2 g of di-tert.-butylperoxide are added and the mixture is stirred at this temperature until a viscosity corresponding to a discharge time according to DIN 53 211, of 50 sec., 50% in styrene, in the DIN 4 mm-beaker is measured.

At 140° C., the pressure is then lowered to about 1 bar and the mixture of volatile materials is released, until a stoving residue with 99.5% solids content is obtained and a viscosity corresponding to a discharge time, according to DIN 53 211, of 61 sec, 50% in styrene, as well as an acid number of 103 are achieved.

PRODUCT III

After cooling to 100° C., 198 g of diethylamine are added via the reflux condenser and the mixture is stirred for 2 h at this temperature.

Production of Dispersion V

Of the resin melts produced in this manner, 2750 g are added with stirring to an aqueous phase heated to 70° C., such that a finely-dispersed dispersion with an acid number of 73, a viscosity of 1380 mPa.s at 20° C. and a solids content of 30.6% is formed.

The aqueous phase is produced from 6083 g of deionized water, 150 g of a 30% aqueous ammonia solution, 30 g of triethylamine, 41 g of butanone oxime and 114 g of the following described siccative dispersion IV.

SICCATIVE DISPERSION IV 725.2 g of cobalt octoate solution with a 6% cobalt metal content, dissolved in benzene are placed at room temperature in a 4 l glass flask provided with stirrer, reflux condenser and dropping funnel, and 455.6 g of N-methyl pyrrolidone are added. After dissolving, 455.6 g of ethoxylated nonylphenol are added with stirring and after dissolving, homogenised with slow addition of 1363.6 g of de-ionized water via the dropping funnel.

EXAMPLE 2

Product I

The addition product is produced according to the procedure of Example 1 from 1500 g of polybutadiene oil, 294 g of maleic acid anhydride, 7.5 g of copper napthenate and 0.81 g of acetyl acetone.

PRODUCT II

As described in Example 1, a mass graft copolymer with a viscosity corresponding to a discharge time, according to DIN 53 211, of 48 sec, 50% in styrene, is produced with addition of 624 g of styrene, 3.0 g of di-tert.-butylperoxide and 7.2 g of n-dodecylmercaptan, which copolymer after the distilling off of volatile components at a reduced pressure of 10 torr, has a viscosity corresponding to a discharge time, according to DIN 53 211, of 62 sec, 50% in styrene, a solids content of 99.6% and an acid number of 121.

PRODUCT III

After cooling to 100° C., 154.8 g of isopropanol are added in 15 min via the reflux condenser. After stirring for 4 h at 100° C., the semi-ester of the maleinated polybutadiene grafted with styrene, which has an acid number of 66.7, is obtained.

PRODUCTION OF DISPERSION V 2305 g of the resin melt produced in this manner are added with stirring to an aqueous phase heated to 70° C., such that a finely divided dispersion is formed with an acid number of 66, a viscosity of 2040 mPa.s at 20° C. and a solids content of 30.3%.

The aqueous phase consists of 5098 g of de-ionized water, 125.7 g of a 30% aqueous ammonia solution, 25.0 g of triethylamine, 34.4 g of butanone oxime and 95.5 g of the siccative dispersion IV described in Example 1.

The production of the primers takes place in the usual manner according to present lacquer technology:

The total quantity of the dispersion V to be used is placed in a mixing container and pigments/extenders are slowly added with a fast stirrer at 3000 RPM, stirred in and predispersed. The actual grinding then takes place on a bead or sand grinder. In order to achieve the grain finess, suitable for primers, of 25 μm and below, measured with the grindometer, a dispersing time of 20 min and a grinding bulk temperature of 40° C. is maintained in each case. The grinding bulk is then adjusted with water to the lacquer delivery viscosity corresponding to a discharge time of 100 sec, measured in the DIN 4 mm beaker.

|  | Example 1 | Example 2 |
| --- | --- | --- |
| Grinding | g | g |
| quantity of dispersion V introduced, neutralized about 30% in water | 333.0 | 333.0 |
| iron oxide | 51.6 | 51.4 |
| lithopones | 78.2 | 78.0 |
| microtalcum | 26.1 | 25.8 |
| silica gel | 1.0 | 1.0 |
| zinc phosphate | 52.1 | 51.7 |
| zinc oxide | 5.2 | 5.2 |
| anti-foaming agent | 1.0 | 1.0 |
| water | 15.0 | 15.0 |
| sum weight of grinding bulk | 563.2 | 559.1 |
| lacquering/finishing |  |  |
| grinding bulk | 563.2 g | 559.1 g |
| water | 4.0 g | 4.0 g |
| total quantity | 567.2 g | 563.1 g |
| pH | 8.5 | 8.75 |
| viscosity corresponding to discharge time, DIN beaker 4mm/20° C. | 100 sec | 95 sec |
| of |  |  |
| solids content | 55.4% | 55.1% |

This lacquer material is drawn out on glass plates with a dumbbell for testing with a gap height of 120 μm.

| Film formation on glass plates | | |
| --- | --- | --- |
| dry film thickness | 30 μm | 30 μm |
| drying at room temperature: |  |  |
| dry so that dust does not stick | 20 min | 50 min |
| free from tackiness | 30 min | 80 min |
| nail hardness after 16 h | good | good |
| after 45 h | very good | very good |
| pendulum hardness (king) |  |  |
| after 16 h | 45 sec | 49 sec |
| after 45 h | 85 sec | 80 sec |
| thorough drying after 16 h | thoroughly dried | thoroughly dried |
| drying 30 min/80° C. | Example 1 | Example 2 |
| nail hardness after cooling | good | good |
| after 1 day at room temperature | good | good |
| pendulum hardness (king) |  |  |
| after cooling | 38 sec | 35 sec |
| after 1 day at room temperature | 60 sec | 55 sec |
| Thorough drying after cooling | thoroughly dried | thoroughly dried |

Further dilution with water to a viscosity corresponding to a discharge time of 35 sec, DIN beaker 4 mm/20° C. is undertaken for adjusting to spraying viscosity. The spraying application takes place with a cup gun under a spraying pressure of 4 bars and a spraying nozzle of 1.2 mm. Car body sheets, 1 mm thick, degreased with butyl acetate, are sprayed.

TABLE 2

|  | Example 1 | Example 2 |
| --- | --- | --- |
| spraying on car body sheets |  |  |
| dry film thickness | 35 μm | 35 μm |
| water resistance after drying at room temperature for 16h (samples immersed in water) |  |  |
| after 1 h | unchanged | unchanged |
| after 3 h | unchanged | unchanged |
| after 24 h | trace of fading, bubbles | some faded, bubbles |
| Protection against corrosion Salt spraying test (DIN 50 021) after drying in air and storing at room temperature: |  |  |
| after 24 h |  |  |
| after 96 h |  | no results bubbles on the section without a scraping test, 20% scraped off, no rusting below |
| after 120 h |  | as Example 1 bubbles on the section with a scraping test, 50% scraped off, no rusting below |
| Condensed Moisture test according to DIN 50 017 after drying in air and storing |  |  |

TABLE 2-continued

| | Example 1 | Example 2 |
|---|---|---|
| at room temperature; | | |
| after 24 h | no results | no results |
| after 96 h | no fading bubbles | some faded bubbles |
| after 168 h | bubbles | bubbles |

TABLE 3

| stability under storage | Example 1 [sec] | Example 2 [sec] |
|---|---|---|
| storage of the primer at 40° C. | | |
| start | 100 | 100 |
| 7 days | 80 | 78 |
| 14 days | 60 | 57 |
| 28 days | 54 | 50 |
| 42 days | 50 | 45 |
| at room temperature | | |
| start | 100 | 100 |
| 1 month | 104 | 102 |
| 2 months | 108 | 105 |
| 4 months | 101 | 104 |

We claim:

1. A process for the production of siccativated aqueous lacquers, the bonding agent of which is a partially neutralized resin, which consists of A. from 40 to 70% by weight of polybutadiene,
B. from 7 to 20% by weight of maleic acid anhydride., up to half the weight of which can be replaced by semi-drying or drying oils,
C. from 10 to 35% by weight of graft monomer and
D. from 3 to 10% by weight of monoalcohol or monoamine based, in each case, on the sum of the components A, B, C and D, the carboxyl groups of this resin, which correspond before neutralization to an acid number of from 40 to 160, being neutralized from 20 to 80%, characterised in that the production of the resin from the components A to D takes place without addition of water and that from 1 to 8% by weight, based on unneutralized resin, of the aqueous dispersion of a siccative is added to the aqueous phase consisting of water, base and optionally component D and optionally auxiliary before dispersion of the resin of A, B, C and optionally D, with the proviso that this siccative dispersion contains (a) from 15 to 20% by weight of water-insoluble siccative,
(b) from 10 to 20% by weight of water-miscible organic solvent,
(c) from 1 to 20% by weight of emulsifier and
(d) from 40 to 74% by weight of water, based, in each case, on the aqueous siccative dispersion.

2. A process according to claim 1, characterised in that the component (b) is N-methyl pyrrolidone.

* * * * *